United States Patent [19]

Honma

[11] Patent Number: 4,481,289
[45] Date of Patent: Nov. 6, 1984

[54] METHOD FOR MANUFACTURING PHOTOGRAPHIC SUPPORT

[75] Inventor: Shigeo Honma, Kawasaki, Japan

[73] Assignee: Mitsubishi Paper Mills, Ltd., Tokyo, Japan

[21] Appl. No.: 359,296

[22] Filed: Mar. 18, 1982

[30] Foreign Application Priority Data

Mar. 23, 1981 [JP] Japan ................................ 56-42105

[51] Int. Cl.³ .............................................. G03C 1/86
[52] U.S. Cl. .................................... 430/532; 427/40; 427/41; 427/326; 528/483; 528/490
[58] Field of Search ........................... 427/40, 41, 326; 528/483, 490; 430/532

[56] References Cited

U.S. PATENT DOCUMENTS 3,549,406 12/1970 Ambusk ............................ 427/40 X
3,582,337 6/1971 Griggs et al. .................. 430/532 X
4,220,471 9/1980 Date et al. ........................... 430/532

OTHER PUBLICATIONS

Ozon Treatment for the Improvement of Bond Strength in Extrusion Coating., (Tappi Paper Synthetics Conference in 1975).

Einfluss der Vorkehandlung auf die AL/LDPE-Verbundhaftung, (Kunstoffe vol. 70, (1980), No. 1 pp. 36-37.

Primary Examiner—Michael R. Lusignan
Attorney, Agent, or Firm—Cushman, Darby & Cushman

[57] ABSTRACT

In manufacturing a photographic support by coating a travelling paper substrate with a polyolefin resin, the adhesion of the resin to the substrate can be markedly improved by subjecting the uncoated paper substrate to an activation treatment on the side to be subsequently coated with the polyolefin resin and exposing the side of the molten polyolefin resin to be brought into contact with said paper substrate to an ozone-containing gas blown against said molten resin. This method leaves behind no adverse effect on the photographic emulsion which is subsequently applied and permits of marked improvement of the productivity at a low cost.

20 Claims, No Drawings

METHOD FOR MANUFACTURING PHOTOGRAPHIC SUPPORT

This invention relates to a method for manufacturing a photographic support (base) improved in adhesion of a polyolefin resin to the paper substrate.

Because of their excellent water- and moistureproofness, synthetic resins of the polyolefin type such as polyethylene and polypropylene are coated on paper in various fields to make the paper waterproof. In coating paper materials with a polyolefin, a most generally employed method is so-called extrusion coating, in which a molten polyolefin extruded from a T-die of an extruder in the form of film is delivered upon a travelling paper material and laminated by means of cooling rolls and press rolls. However, being nonpolar in its nature, a polyolefin is not always satisfactory in adhesion to paper and there are sometimes obtained coated paper materials of insufficient bonding between the polyolefin and the paper material, depending upon the type of material and the method of manufacture.

Photographic materials comprising a polyolefin-coated paper material as support and at least one layer of a photosensitive silver halide emulsion provided on at least one coated side are currently being used chiefly in water-resistant photographic paper materials for color or monochrome photography or in so-called graphic arts materials (GAM) such as plate materials or block copy materials for use in light-duty printing. When a polyolefin-coated paper material of insufficient coating adhesion is used as the support for water-resistant photographic paper, various troubles have been known to occur as described below.

When a polyolefin-coated paper of insufficient coating adhesion is used as a water-resistant photographic support, detachment of the polyolefin coating from the base paper will take place at the edges (cut ends) caused by unintentional rubbing or the like, resulting in spoiled appearance. If such detachment takes place in a wet photographic paper during the development processing, the base paper will absorb the processing solutions, thereby to interfere with the intended rapid processing. In cutting a developed photographic paper of insufficient coating adhesion to a predetermined size by means of a photographic paper cutter, there will frequently be formed trailing or whiskering of drawn polyolefin at the cut ends, which injure the esthetic value or, in extreme cases, there will be formed whisker-like bridges connecting two or more cut sheets with one another. If the coating adhesion is defective in a polyolefin-coated paper material used in plate and other materials for light-duty printing, then adhesion failures caused by friction tend to occur during printing operation, resulting in elevated areas which render the printing imperfect or, in extreme cases, wrinkled surface which makes the printing impossible. Therefore, in using a polyolefin-coated paper material as the support carrying a silver halide emulsion layer, it is very important that the adhesion between the paper substrate and the polyolefin be sufficiently high.

Known methods for improving generally the adhesion between paper materials and polyolefins include a method in which the base paper is heat-treated before the molten polyolefins are delivered onto the base paper; a method which employs a corona discharge treatment, as described in Japanese Patent Publication No. 22,834/73; a method in which the base paper is flame-treated, as described in Japanese Patent Publication No. 40,002/74; and methods wherein the paper support is coated with a substance adherent to both the paper and the polyolefin, that is, so-called anchor coating, as described in Japanese Patent Publication No. 25,337/76; Japanese patent application "Kokai" (Laid open) Nos. 96,682/77, 2,612/78, 56,422/79, 111,311/79, 162,537/79 and 4,027/80. It is also possible to improve the adhesion to some extent by elevating the temperature of molten polyolefin resins to 320° C. or above at the exit of a coating extruder or by increasing the thickness of polyolefin coating layer.

However, the base paper for the polyolefin-coated paper used as a photographic support carrying a silver halide emulsion layer is required to be of high smoothness, as contrasted to that used in polyolefin-coated kraft paper or polyolefin-coated paperboard for milk or juice containers. The heat treatment of base paper tends to cause uneven contraction of the paper owing to non-uniform removal of moisture and results in inferior smoothness. The primer treatment requires the steps of coating and drying the primer and, in addition, possibly exerts to an unnegligible extent an adverse effect of primer itself upon the photographic emulsion. The elevation of resin temperature at the extruder exit to 320° C. or above will cause partial decomposition of the polyolefin, resulting in a decline in working efficiency and deterioration of the photographic emulsion layer due to the remnants of decomposition products. Especially when the polyolefin resin contains pigments such as titanium oxide and ultramarine, the decomposition of polyolefin is promoted and the emulsion layer will be affected more adversely. The increase in thickness of the polyolefin coating gives rise to not only an increase in the material cost, but also difficulties in maintaining the product quality because of the change in curl balance. The surface activation treatment of the paper material, such as corona discharge treatment or flame treatment is effective in increasing the coating adhesion, but sufficient adhesion is not obtained for the photographic base paper having a highly smooth surface, when the speed of extrusion coating becomes sufficiently high.

Taking the above situation fully into consideration, the present inventor carried out extensive studies and, as a result, found that in the extrusion coating of a polyolefin, it is possible to improve markedly the adhesion between the photographic base paper and the polyolefin at a low cost without any adverse effect on the photographic emulsion by subjecting the travelling uncoated base paper to an activation treatment on the surface of the side to be subsequently coated with the polyolefin resin, exposing the side of the molten polyolefin resin to be laid over said base paper to an ozone-containing gas blown against said molten polyolefin resin, and coating the travelling base paper with the molten polyolefin resin. It was also found that the above method improves markedly the productivity. Based on the findings the present invention has been accomplished.

According to this invention, there is provided a method for manufacturing a polyolefin-coated photographic support, which comprises subjecting a travelling uncoated base paper to an activation treatment on the surface of the side to be subsequently coated with a polyolefin resin, exposing the side of an extruded molten polyolefin resin to be laid over said base paper to an ozone-containing gas blown against said molten polyolefin resin, and coating the travelling base paper with the molten polyolefin resin.

According to this invention, the surface of the base paper is subjected to an activation treatment such as corona discharge treatment, flame treatment or the like, the first named treatment being preferred. The activation treatment is carried out before the exposure of molten polyolefin resin to an ozone-containing gas stream.

The most widely used method of generating an ozone-containing gas is a so-called silent discharge method using air as raw material, because this method provides a large volume of ozone-containing gas at a low cost with a high efficiency. However, other methods capable of controlling the rate of generation and the concentration of ozone may be used. The ozone-containing gas stream is supplied preferably through a manifold tube provided with slits or perforations, but other supply mechanisms capable of uniformly distributing the ozone-containing gas stream against the molten polyolefin resin may be used. The extruded molten polyolefin resin in film form is exposed to the ozone-containing gas at a distance of 1 to 40 mm, preferably 3 to 20 mm from the gas exit. If the distance is too short, the molten resin might accidentally touch the gas exit to cause troubles, while if the distance exceeds 40 mm, the molten resin film would not be uniformly and sufficiently exposed to the ozone-containing gas, resulting in a decrease in the efficiency of treatment.

The suitable amount of ozone contacting the molten polyolefin resin is 5 to 200 mg, preferably 10 to 150 mg per square meter of the resin surface. If the amount is below 5 mg, the coating adhesion is not improved, while if it exceeds 200 mg, undesirable fogging will take place in the silver halide photosensitive emulsion layer which is applied afterwards.

The temperature of the ozone-containing gas in contact with the molten resin should be sufficiently high so that there will be not too much temperature difference between the gas and the molten resin. A suitable gas temperature is in the range of 70° to 320° C., preferably 150° to 300° C. If the gas temperature exceeds 320° C., the decomposition of ozone will be accelerated, whereas if it is below 70° C., the temperature of molten resin surface will decrease too much, the ozone treatment becoming less effective in both cases.

The optimum amount of ozone contacting the molten resin surface varies with the travelling speed of the base paper. When the travelling speed is about 60 m/minute, an ozone amount of 5 mg/m$^2$ is sufficient for the improvement of coating adhesion, whereas the optimum amounts of ozone are about 10 mg/m$^2$, 20 mg/m$^2$ or above, and 50 mg/m$^2$ or above for the paper speeds of about 100 m/minute, 150 m/minute or above, and 20 m/minute or above, respectively.

In examples of embodiments of this invention, desirable results were obtained when the travelling speed of base paper is as high as 150 m/minute or above, or the temperature of molten polyolefin resin at the exit of extruder is as low as 250° to 280° C., and the molten resin contains a white pigment such as titanium oxide and/or a colored pigment and/or a lubricant such as zinc stearate or calcium stearate. According to prior arts, a sufficient adhesion between the base paper and the polyolefin resin is difficult to obtain when the travelling speed of base paper is high or the molten resin temperature is low. When the resin contains a white pigment or the like, the molten resin temperature must be kept as low as possible in order to avoid an adverse effect on the photographic emulsion exerted by the accelerated decomposition of polyolefin, as described above.

The suitable extent of corona discharge treatment is not specifiable, because it depends on the degree of ozone treatment of the surface of molten polyolefin resin, the temperature of molten resin leaving the extruder, the travelling speed of base paper, and the temperature of ozone-containing gas.

The polyolefin resins suitable for use in the present method include homopolymers of $\alpha$-olefins having 2 to 8 carbon atoms such as ethylene and propylene, copolymers of two or more $\alpha$-olefins such as ethylene and propylene, copolymers of an $\alpha$-olefin, as major component, and another monomer copolymerizable with the $\alpha$-olefin, and mixtures of these polymers. A particularly preferred polyolefin resin is polyethylene. The polyethylene used in the present method is low-density polyethylene, high-density polyethylene, or a mixture thereof. Since low-density polyethylene is superior to high-density polyethylene from the viewpoint of adhesiveness, it has heretofore been necessary, wherever a mixture is needed, to use a mixture comprising a much larger proportion of low-density polyethylene to secure an intended coating adhesion to a paper material. According to this invention, when needed, a mixture comprising a higher proportion of high-density polyethylene can be used. A preferable ratio of low-density polyethylene to high-density polyethylene is from 70 : 30 to 10 : 90. According to the present invention, high-density polyethylene may be solely employed as polyethylene.

The polyethylene resin used in the present method may contain white pigments such as titanium oxide, zinc oxide and alumina, fibrous fillers such as glass fiber and asbestos, pigment colors such as carbon black and ultramarine, fluorescent whiteners, and other common additives for resins, such as stabilizers, antistatics, antioxidants, plasticizers, dispersants and lubricants.

The present method for manufacturing a polyolefin-coated photographic support of good coating adhesion by treating a molten polyolefin with an ozone-containing gas stream offers the following advantages:

(1) The photographic support obtained according to this invention exhibits a high adhesion of the polyolefin coating to the base paper. Consequently, (a) no separation of the coating from the base paper occurs at edges (cut ends), and, hence, the photosensitive material is kept from the injury in appearance; (b) no separation of the coating from the paper occurs in the development processing so that the rapid processing can be achieved; and (c) when cut with a cutting tool, the photosensitive material is kept from formation of trailing or whiskering of drawn polyolefin at the cut edges.

(2) The extrusion temperature of polyolefin can be decreased to a temperature below 320° C. which is close to the decomposition temperature of polyolefin. Consequently, (a) deterioration of polyolefin coating in strengths and physical properties can be reduced; (b) adverse effects of the thermal decomposition products on the silver halide emulsion can be eliminated; and (c) working efficiency is improved.

(3) The thickness of polyolefin coating can be reduced to 5 to 30 $\mu$. Consequently, (a) the curl balance of the photosensitive material can be more easily optimized; and (b) the coated support is manufactured at a low cost because of reduced material cost.

(4) Polyolefin resins of widely different densities can be used. Consequently, (a) the curl balance of the photosensitive material can be easily optimized; and (b) the polyolefin-coated side of the support can be easily released from the cooling roller surface (as contrasted, in the case of a polyolefin-coated support manufactured by the conventional method, a number of tiny areas of different gloss, which consist of areas having lower gloss and areas having higher gloss than the remaining area, are frequently observed all over the coated side).

(5) The ozone-containing gas treatment in the present method exerts entirely no adverse effect on the silver halide emulsion layer.

(6) The ozone-containing gas treatment is carried out economically by using air as the raw material for the ozone-containing gas.

(7) The speed of extrusion coating can be increased so as to increase the productivity.

In the following Examples, the adhesion between the base paper and the polyolefin coating was evaluated by peeling the coating film off the base paper at a separation angle of 180 degree (180° turn back peel) and visually inspecting the surface of the base paper to rate the adhesion in accordance with the criteria shown below. The inspection was conducted under the light ray incident to the surface at an oblique angle. Where the adhesion is strong, fibers of the superficial layer of paper adhere to the coating film, while where weak, the surface of paper remains smooth.

| Fraction of area of paper adhered to coating film based on total area of paper (%) | Adhesion rating (grade) | |
|---|---|---|
| 100 | A | Good |
| 80–99 | B | ↑ |
| 60–79 | C | |
| 40–59 | D | ↓ |
| 0–39 | E | Poor |

The degree of ozone treatment was expressed in terms of weight (mg) of ozone in the ozone-containing gas blown against 1 m² of the molten polyolefin resin surface (unit: mg/m²).

The corona discharge treatment was performed by using a corona generator of the vacuum tube type (type HF-600 of Taisei Sangyo Co.; oscillation frequency, 110 kHz; high frequency output, 6 kW). The level of corona discharge treatment was varied by varying the positive electrode current.

The fog in the silver halide emulsion layer was tested by developing an unexposed photosensitive material by the prescribed procedure, measuring the reflectance of the surface of emulsion layer against white light, and calculating the relative reflectance. The relative reflectance, as herein referred to, is a value defined by the formula:

$$\text{Relative reflectance} = \frac{\text{Reflectance of emulsion layer of unexposed sensitive material after development by prescribed procedure}}{\text{Reflectance of standard magnesium oxide plate}}$$

EXAMPLE 1

In this Example, a base paper sheet, 140 g/m² in basis weight, for use as photographic support was extrusion-coated with a polyethylene resin composition prepared by uniformly dispersing 10% by weight (based on resin mixture) of anatase-type titanium oxide and 1.5% by weight (based on resin mixture) of zinc stearate in a mixture of 70% by weight of low-density polyethylene having a density of 0.918 g/cm³ and 30% by weight of high-density polyethylene having a density of 0.962 g/cm³. In the extrusion-coating step, the travelling speed of the base paper was 150 m/minute and the resin temperature at the extruder exit was 300° C. Before the resin coating was applied, the base paper had undergone corona discharge treatment on the side to be coated with the resin. The corona discharge electrode was of the bartype, 60 mm in length, the positive electrode current was 0.5A, and the distance between the electrode and the base paper was 1 mm.

The extruded molten resin in film form was treated with an ozone-containing gas blown against the side to be brought into contact with the base paper sheet. The ozone-containing gas used was an ozonized air generated from air by means of an ozonizer made by Mitsubishi Electric Corp. The rate of generation and the concentration of ozone were varied by controlling the air feed and the primary voltage of the ozonizer so as to adjust the amount of ozone contacting the resin surface to 3, 5, 60, 200 or 250 mg/m². The temperature of ozonized air was 200° C. and the width covered by the blown ozonized air was 300 mm. The distance between the molten resin surface and the ozonized air exit was 10 mm. The thickness of the extruded molten resin was 30 μ. For comparison, in the comparative run No. 1, the ozone treatment was omitted.

The polyolefin-coated photographic support thus prepared was coated on the polyolefin-coated side with a silver halide emulsion of the prescribed composition and tested for the fog. The results obtained were as shown in Table 1.

TABLE 1

| | Amount of ozone blown against molten resin surface (mg/m²) | Adhesion rating (grade) | Fog (relative reflectance) |
|---|---|---|---|
| Comparative Run No. 1 | 0 | D | 0.91 |
| Run No. 1 | 3 | C | 0.91 |
| Run No. 2 | 5 | B | 0.90 |
| Run No. 3 | 60 | A | 0.91 |
| Run No. 4 | 200 | A | 0.89 |
| Run No. 5 | 250 | A | 0.84 |

Run No. 5 showed considerable fogging.

EXAMPLE 2

The effect of corona discharge treatment on the adhesion was examined when the amount of ozone blown against the molten polyethylene resin was 60 mg/m². Other conditions were the same as in Example 1. The results obtained were as shown in Table 2.

TABLE 2

| | Corona discharge treatment | Adhesion rating (grade) | Fog (relative reflectance) |
|---|---|---|---|
| Comparative Run No. 2 | No | E | 0.91 |
| Run No. 6 | Yes | A | 0.91 |

The experimental conditions and the results of Run No. 6 were the same as those of Run No. 3 in Example 1. The adhesion was not improved when the corona discharge treatment of the base paper was omitted.

EXAMPLE 3

The effect of the temperature of ozonized air blown against the resin was examined at 50° and 200° C. Other conditions were the same as in Example 1. The results obtained were as shown in Table 3.

TABLE 3

| | Temperature of ozonized air (°C.) | Adhesion rating (grade) | Fog (relative reflectance) |
|---|---|---|---|
| Run No. 7 | 200 | A | 0.91 |
| Run No. 8 | 50 | C | 0.90 |

The experimental conditions and the results of Run No. 7 were the same as those of Run No. 3 of Examale 1.

EXAMPLE 4

A base paper sheet, 160 g/m² in basis weight, was extrusion-coated with a resin composition prepared by uniformly dispersing 10% by weight (based on resin) of rutile-type titanium oxide and 1.5% by weight (based on resin) of calcium stearate in low-density polyethylene having a density of 0.918 g/cm³. In the extrusion-coating step, the travelling speed of base paper was 200 m/minute and the temperature of resin composition at the exit of extruder was 270° or 340° C. Corona discharge treatment was conducted under the same conditions as in Example 1. The amount of ozone blown against the molten resin composition was 100 mg/m² and the temperature of the ozonized air was 200° C. The width of molten resin covered by the blown ozonized air and the distance between the molten resin surface and the exit of ozonized air were the same as those in Example 1.

The photographic support thus obtained was coated on the polyethylene-coated side with a silver halide emulsion of the prescribed composition and tested for the fog. The results obtained were as shown in Table 4.

TABLE 4

| | Amount of ozone blown against 1 m² of molten resin surface (mg/m²) | Temperature of resin (°C.) | Adhesion rating (grade) | Fog (relative reflectance) |
|---|---|---|---|---|
| Comparative Run No. 3 | 0 | 270 | E | 0.92 |
| Run No. 4 | 0 | 340 | B | 0.83 |
| Run No. 9 | 100 | 270 | A | 0.91 |

Comparative Run No. 4 showed considerable fogging.

EXAMPLE 5

Photographic supports were prepared in the same manner as in Run No. 3 (amount of ozone blown against resin: 60 mg/m²) of Example 1, except that the weight ratio of low density (0.918 g/cm³) polyethylene to high density (0.962 g/cm³) polyethylene was 50/50, 30/70 or 10/90 in place of 70/30. The supports thus prepared were tested for adhesion and fog (relative reflectance).

Comparative Run No. 5 was conducted in the same manner as in Comparative Run No. 1 in Example 1, except that the weight ratio of low-density polyethylene to high-density polyethylene was 50/50 in place of 70/30. The support was tested similarly to other supports mentioned above.

TABLE 5

| Run No. | Ratio of low density polyethylene to high density polyethylene (wt.-%/ wt.-%) | Adhesion rating (grade) | Fog (relative reflectance) |
|---|---|---|---|
| 10 | 70/30 | A | 0.91 |
| 11 | 50/50 | A | Practically the same as in Run No. 10 |
| 12 | 30/70 | A | |
| 13 | 10/90 | B | |
| Comparative Run No. 5 | 50/50 | E | Practically the same as Run No. 1 |

The experimental conditions and the results of Run No. 10 were the same as those of Run No. 3 of Example 1.

EXAMPLE 6

Photographic supports were prepared in the same manner as in Run No. 3 (amount of ozone blown against resin: 60 mg/m²) of Example 1, except that the thickness of the coating layer of polyethylene resin composition was 23, 15 or 7 μ in place of 30 μ. The supports thus prepared were tested for adhesion and fog (relative reflectance). Comparative Run No. 6 was conducted in the same manner as in Comparative Run No. 1 (in which the ozone treatment was omitted) in Example 1, except that the thickness of the coating layer of polyethylene resin composition was 15 μ in place of 30 μ. The support was tested similarly to other supports mentioned above.

TABLE 6

| Run No. | Thickness of coating layer of polyethylene resin composition (μ) | Adhesion rating (grade) | Fog (relative reflectance) |
|---|---|---|---|
| 14 | 30 | A | 0.91 |
| 15 | 23 | A | Practically same as the value of Run No. 14 |
| 16 | 15 | A | |
| 17 | 7 | B | |
| Comparative Run No. 6 | 15 | E | Practically same as the value of Comparative Run No. 1 |

The experimental conditions and the results of Run No. 14 were the same as those of Run No. 3.

What is claimed is:

1. A method for manufacturing a silver halide photographic material comprising a polyolefin-coated paper support and at least one layer of a photosensitive silver halide emulsion provided thereon, which comprises
    subjecting a travelling uncoated base paper to corona discharge treatment on the side on which a molten polyolefin resin is to be coated and, thereafter, on which the layer of a photosensitive silver halide emulsion is to be provided;

extruding the molten polyolefin resin containing from 5 to 15% by weight of white pigment at a resin temperature at an extruder exit of from 250° to 300° C., the molten polyolefin resin being extrusion-coated on the side of the base paper on which the photographic silver halide emulsion is to be provided;

exposing the side of said molten polyolefin resin to be brought into contact with said base paper to an ozone-containing gas blown against said molten resin in an amount of ozone of from 10 to 200 mg/m$^2$;

extrusion-coating the base paper with said molten polyolefin resin to prepare the polyolefin-coated paper support; and providing at least one layer of a photosensitive silver ahlide emulsion on the polyolefin resin layer of the polyolefin-coated paper support.

2. A method according to claim 1 wherein the polyolefin resin is polyethylene, polypropylene or an ethylenepropylene copolymer.

3. A photographic support obtained by the method of claim 2.

4. A method according to claim 1, wherein the amount of ozone is 20 to 150 mg per square meter of the molten polyolefin surface.

5. A method according to claim 1, wherein the temperature of the ozone-containing gas blown to the side of molten polyolefin resin to be brought into contact with the base paper is 70° to 320° C.

6. A method according to claim 5, wherein the temperature of the ozone-containing gas is 150° to 300° C.

7. A method according to claim 1, wherein the temperature of the molten polyolefin resin at the extruder exit is 250° to 280° C.

8. A method according to claim 1, wherein the distance between the ozone-containing gas exit and the molten resin surface is 1 to 40 mm.

9. A method according to claim 1, wherein the travelling speed of the base paper is 150 to 200 m/minute and the amount of ozone blown against the molten resin is 20 to 100 mg/m$^2$.

10. A method according to claim 1, wherein the travelling speed of the base paper is 200 m/minute or above and the amount of ozone blown against the molten resin is 50 to 200 mg/m$^2$.

11. A method according to claim 1, wherein the white pigment content is 8 to 13% by weight based on polyolefin resin, the travelling speed of the base paper is 180 to 220 m/minute, the resin temperature at the extruder exit is 260° to 280° C., the amount of ozone blown against the resin is 80 to 120 mg/m$^2$, and the ozone-containing gas temperature is 160° to 240° C.

12. A method according to claim 1, wherein the white pigment content is 8 to 13% by weight based on polyolefin resin, the travelling speed of the base paper is 130 to 170 m/minute, the resin temperature at the extruder exit is 280° to 300° C., the amount of ozone blown against the resin is 40 to 80 mg/m$^2$, and the ozone-containing gas temperature is 160° to 240° C.

13. A method according to claim 1, wherein the polyolefin resin is a mixture of low-density polyethylene and high-density polyethylene.

14. A method according to claim 13, wherein the weight ratio of low-density polyethylene to high-density polyethylene in the polyethylene mixture is from 70/30 to 10/90.

15. A method according to claim 1, wherein the thickness of the polyolefin resin is 5 to 30$\mu$.

16. A photographic support obtained by the method according to claim 1.

17. A photographic support obtained by the method according to claim 11.

18. A photographic support obtained by the method according to claim 12.

19. A photographic support obtained by the method according to claim 13.

20. A photographic support obtained by the method according to claim 15.

* * * * *